Nov. 11, 1930. C. A. CALDWELL 1,780,994
SEALING DEVICE FOR COCKS
Filed Oct. 25 1929
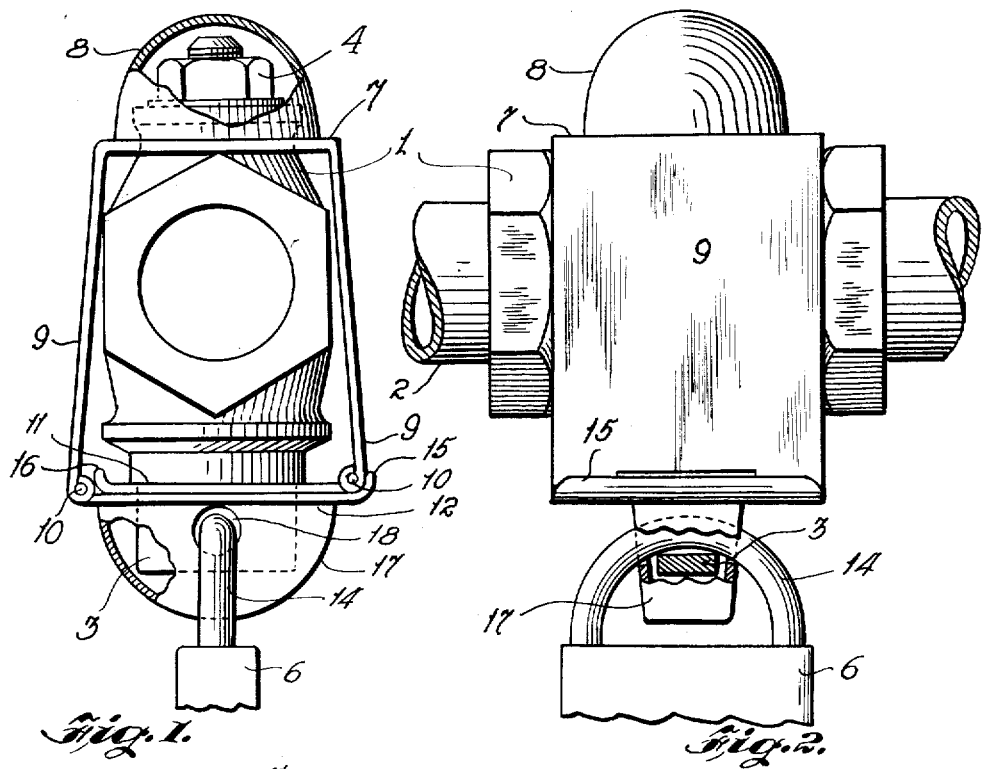
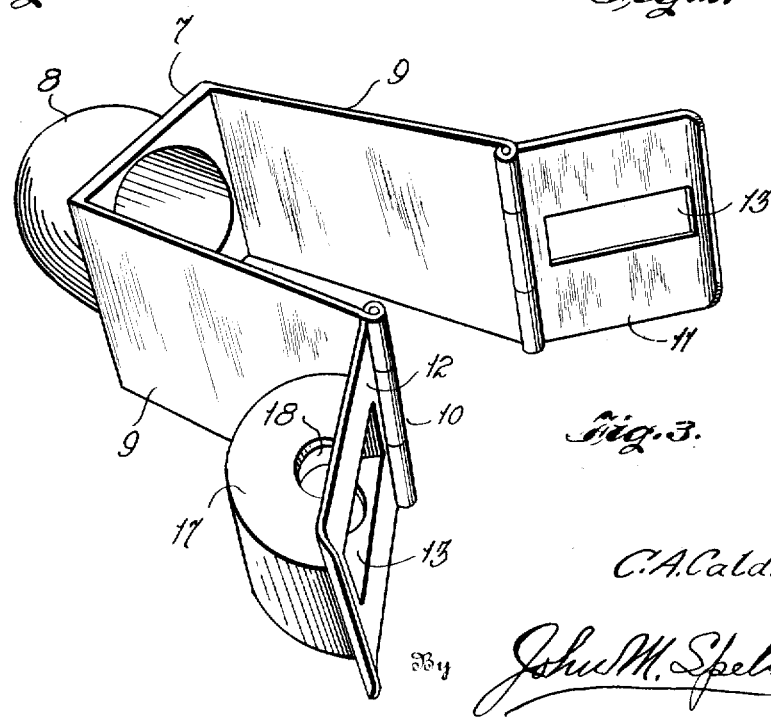

Patented Nov. 11, 1930

1,780,994

UNITED STATES PATENT OFFICE

CHARLES A. CALDWELL, OF DALLAS, TEXAS

SEALING DEVICE FOR COCKS

Application filed October 25, 1929. Serial No. 402,523.

My invention has relation to a device for sealing or locking valves or cocks when in inoperative or operative position to prevent accidental or intentional interference with the same.

The present invention is an improvement over United States Letters Patent No. 1,158,631 issued to me on November 2, 1915.

The object of the present invention is to improve the locking device by additional parts affording a greater protection to the valve or cock to which applied. In the locking device covered by said patent there is provided a box-shaped member arranged to snugly fit two opposite sides and the base of the valve or cock and including two hinged lids arranged to fold down upon and interlock with the projecting stem or key of the valve or cock, the other part of said device having a padlock or other locking mechanism designed to lock said lids down upon said stem or key but leaving the stem exposed.

In the present invention one of said lids has formed thereon a housing which completely covers the stem of the locking device and enabling the stem to be firmly locked in whatever position desired. There is also provided means for more conveniently enclosing the usual nut accompanying the valve casing.

In the drawings forming part of this specification:

Figure 1 is an end elevational view of a valve and locking device, embodying my invention, Figure 2 is a front elevational view of the valve and locking device, and Figure 3 is a perspective view of the locking device removed from the valve or cock.

Referring more closely to the drawings, 1 represents a valve or cock of well known construction and 2 the pipe controlled by said valve. The valve 1 has a stem 3 and a nut 4 projecting from the side of the valve casing opposite the side from which the stem 3 projects. The valve stem has an opening extending transversely through the stem.

The sealing or locking device embodying my invention consists essentially of a box-shaped member and a padlock 6. The box-shaped member has a base 17 countersunk and forming a dome 8 to enclose a portion of the valve and the nut 4 of the stem, and including two side walls 9, snugly fitting the sides of the valve casing. The base 7 and walls 9 are preferably formed of one piece of sheet metal.

To the end of each wall 9 is suitably hinged as at 10 the lids 11 and 12, one of which 11 is arranged to fold down below the other lid 12. Each of these lids has a slot 13 adapted to fit over and to permit of the protuberance of the stem 3 therethrough. When in position each lid 11 and 12 folds down successively over the stem 3, clearly shown in Figures 1 and 2, the stem projecting therethrough, to receive the hasp 14 of the padlock 6, through the opening in the stem. Each lid 11 and 12 has a curved lip 15 and 16. The lip 15 of lid 12, when the lids are closed, fits outside the hinge 10, and the lip 16 of lid 11 bears against the inside of the hinge. It is obvious that the slots 13 may be altered in position to suit requirements, that is whether the device is applied to a closed valve as shown in the drawings, or to an open valve.

Formed integrally with the lid 12 and disposed over the slot 13 therein is a housing 17 of curved formation. This housing has an opening 18 registering with the opening in the stem 3 when the lids are closed as in Figures 1 and 2. Thus when the two lids are closed, the stem is completely covered and the cock or valve adequately protected.

What is claimed as new is:

In a locking device for valves or cocks, a box-shaped member formed to enclose the sides and bottom of the valve or cock, the end of the member being countersunk and forming a projecting dome-like housing for enclosing the nut and one end of the valve or cock; a lid projecting from each side of the box-shaped member, each lid having a slot, one slot registering with the other when the lids are closed on the valve; one of said lids including a housing disposed over its slot and adapted to entirely cover the stem of the valve, when the lids are closed; and a locking device traversing the stem and said housing to lock the valve stem in open or closed position.

In testimony whereof I affix my signature.
CHARLES A. CALDWELL.